Oct. 4, 1960  W. R. GROVES  2,954,584
MOULDING PRESSES
Filed April 22, 1958  5 Sheets-Sheet 1

Inventor:
Walter Robert Groves
By his attorneys:
Baldwin & Wight

Oct. 4, 1960  W. R. GROVES  2,954,584
MOULDING PRESSES

Filed April 22, 1958  5 Sheets-Sheet 2

Inventor:
Walter Robert Groves
By his attorneys:
Baldwin & Wight

United States Patent Office 2,954,584
Patented Oct. 4, 1960

2,954,584

MOULDING PRESSES

Walter Robert Groves, Wolverhampton, England, assignor to British Industrial Plastics Limited, London, England, a company of Great Britain Filed Apr. 22, 1958, Ser. No. 730,196

Claims priority, application Great Britain Apr. 26, 1957

5 Claims. (Cl. 18—16)

This invention relates to moulding presses, and in particular to moulding presses which are adapted to be fully automatic in operation so that a cycle of operations may be repeatedly carried out in exactly the same order. In the construction of such presses it is necessary to arrange the loading apparatus for feeding the charge or charges of moulding material to the press in each cycle of operations on one side of the press, and to arrange the stripping apparatus for removing the moulded article or articles from the mould in each cycle, on the other side of the press, and this equipment obstructs the operator of the press from readily reaching the press moulds when any adjustment has to be made thereto.

The object of this invention is to overcome this difficulty in a simple, but effective manner, and this object is achieved, according to the invention, by an arrangement in which the loading apparatus and/or the stripping apparatus is or are hingedly mounted on its or their respective side of the press about a vertical axis so as to be capable of swinging movement outwardly away from and inwardly towards the press, and to be secured in operative position by a quick release clamp. By this arrangement complete access may be obtained to the mould from one or both sides of the press merely by releasing the clamp securing the respective apparatus to the press in operative position and swinging aside the apparatus about the axis of the hinged mounting clear of the press moulds and platens to non-operative position.

All the services (i.e. electric, pneumatic or hydraulic or the like) are conveyed in flexible conductors from the press to the respective apparatus or each apparatus swingably mounted thereon in accordance with the invention to accommodate movement of the respective apparatus or each apparatus between operative and non-operative positions.

Any suitable means may be used for hingedly mounting the apparatus or each apparatus on the press, and any suitable type of quick release clamp may also be used.

Preferably the respective apparatus, or each apparatus, is mounted as an assembly on a supporting carriage which is adapted to be swung about one of a pair of vertically disposed guide rods arranged on either side of the supporting carriage and on which the supporting carriage is mounted for vertical adjustment, and to be clamped to the other of the pair of guide rods by said quick release clamp.

The guide rods may be rotatably connected to the supporting carriage and slidably and rotatably mounted on the press, the guide rods having screw threaded portions co-operating with screw threaded means carried by the press, whereby rotation of the guide rods causes vertical movement thereof with respect to the press.

A preferred embodiment of the invention is illustrated diagrammatically, by way of example, in the accompanying drawings in which.

Figure 1:
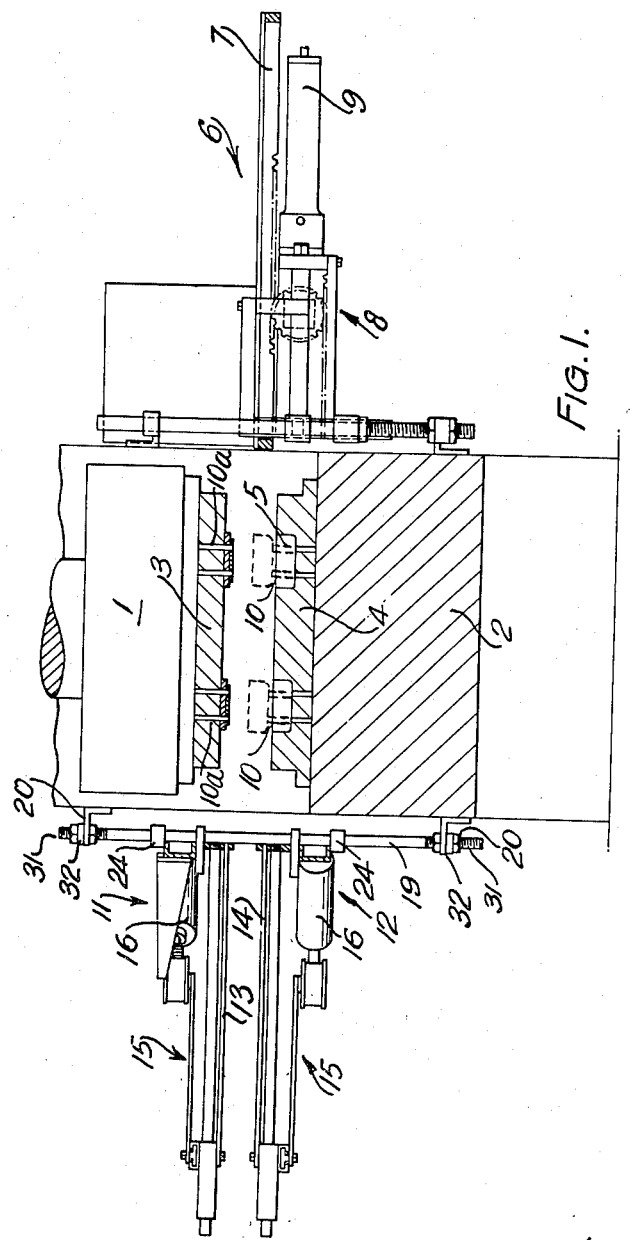
Fig. 1 is a side elevation, partly in section, of a moulding press with the feeding apparatus therefor, and the stripping apparatus therefor, arranged on opposite sides.
Figure 4A:
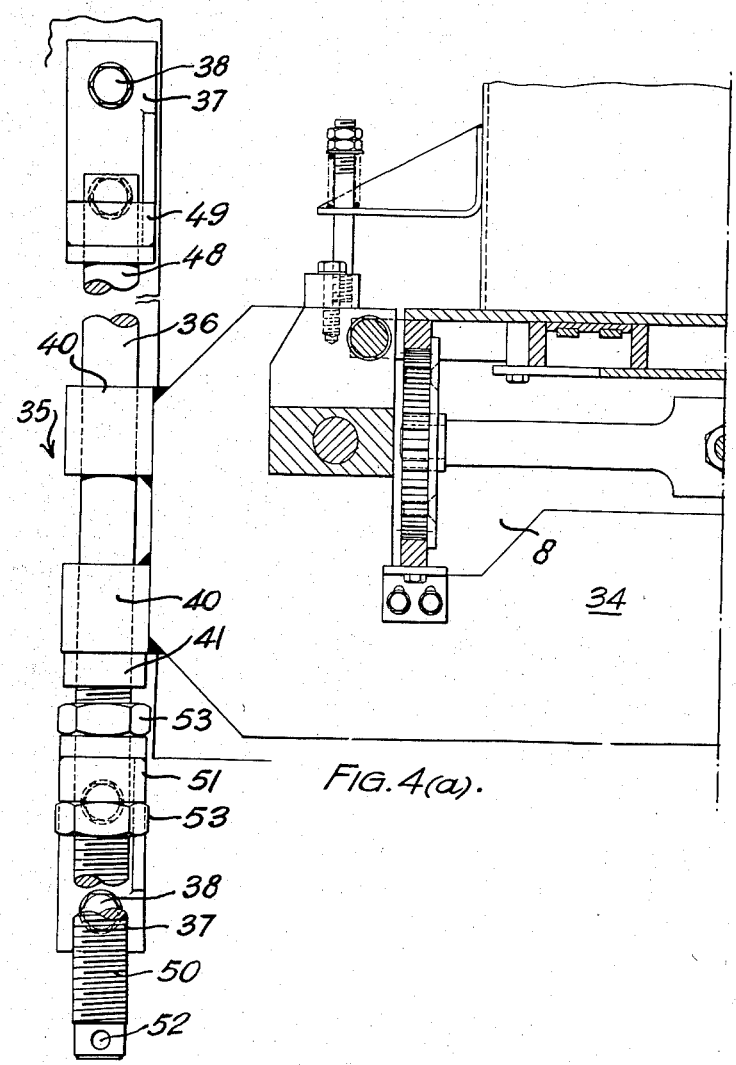
Figure 4B:
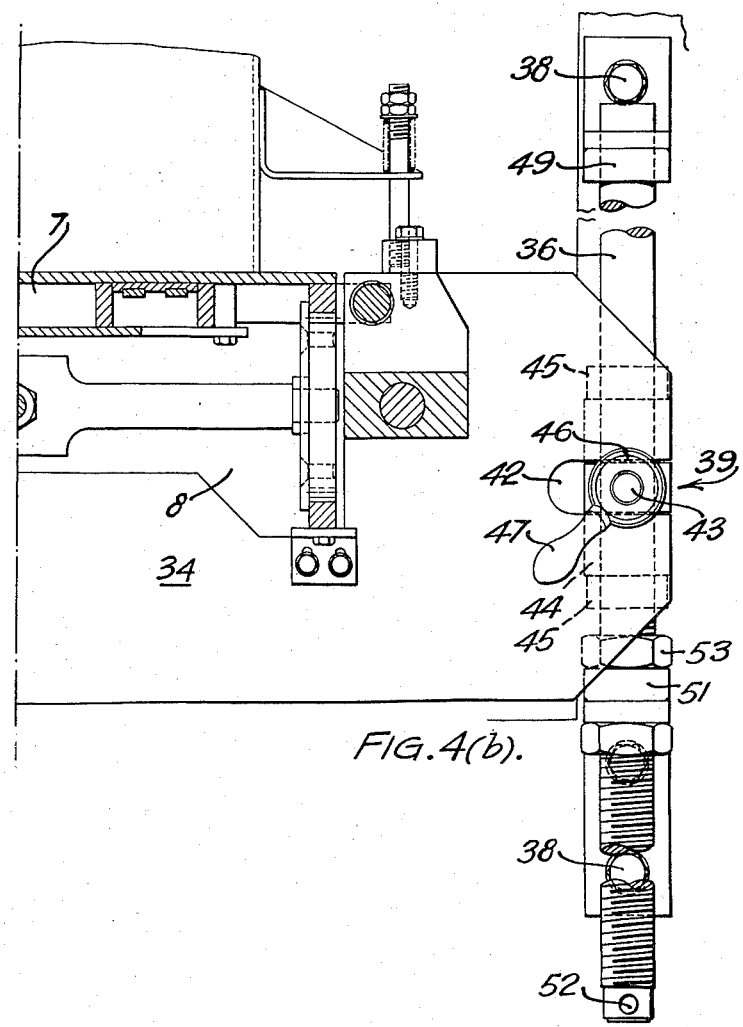

Fig. 4(a) and Fig. 4(b), considered as joined along the vertical dot-dash line in each, together constitute a rear elevation, on an enlarged scale, of the feeding apparatus as viewed from the right of Fig. 1.

Figure 2:
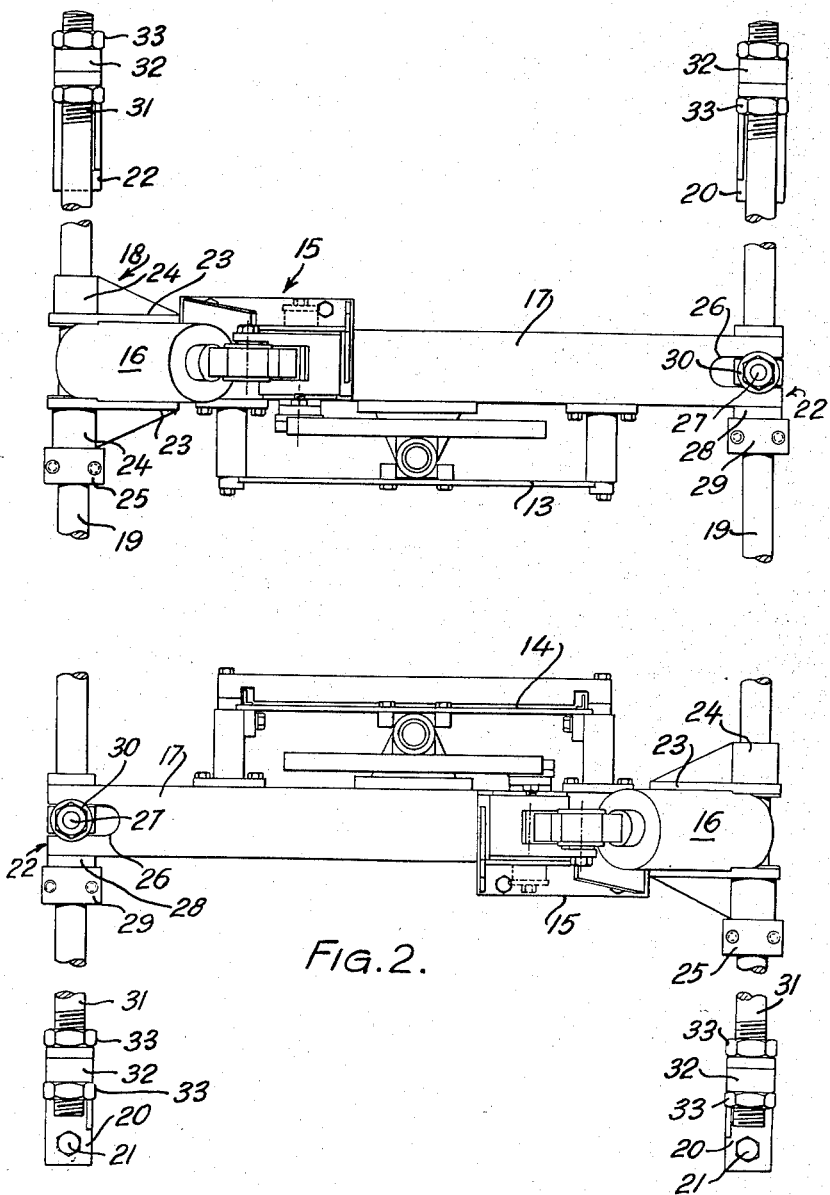
Fig. 2 is a front elevation, on an enlarged scale, of the stripping apparatus as viewed from the left of Fig. 1.

Referring to the drawings, and particularly to Fig. 1, 1 and 2 are the upper and lower platens respectively of a flat bed moulding press of known type carrying respectively upper and lower molds 3 and 4. The lower mould is formed with die cavities 5 which, when the press is open as shown, are each filled with a charge of moulding material, in the form of powder or preformed pellets, by means of the feeding apparatus generally indicated at 6 on the right side of the press shown in the drawings. Such feeding apparatus comprises a reciprocable loading plate 7, of known type, adapted to be moved into and out of the space between the press platens, by a drive mechanism generally indicated at 8 having an operating fluid pressure jack 9, to deposit a charge of moulding material in each die cavity in a manner well known in the art and needing no further explanation. The space between the press platens is normally referred to as the press "daylight" and will be so referred to hereinafter. As the loading plate and drive mechanism therefor form no part of the present invention, it is considered unnecessary to describe them in any further detail.

When the die cavities have been filled with their charges of moulding material and the press moulds have been closed to effect a moulding operation, the moulded articles, on opening of the press moulds, are raised out of the die cavities on ejector pins 10 in the case of the lower mould 4, or projected from the upper mould 3, by such ejector pins shown at 10a, and the moulded articles are removed from the press by means of upper and lower stripping apparatus generally indicated at 11 and 12 respectively on the left side of the press shown in the drawings. Each stripping apparatus comprises a stripping plate 13 or 14 respectively co-operating with the upper and lower moulds respectively in known manner. Each stripping plate is adapted to be moved into and out of the press daylight by a drive mechanism generally indicated at 15 having an operating fluid pressure jack 16, to receive the articles from the ejector pins and remove them from the press in a manner well known in the art and needing no further explanation. As the stripping plates and drive mechanism therefor form no part of the present invention it is considered unnecessary to describe them in any further detail.

In accordance with the invention, the feeding apparatus and both stripping apparatus are hingedly mounted on the press so as to be swingable about a vertical axis, towards or away from the press to facilitate access to the apparatus and to the press moulds when maintenance etc. is required.

Figure 3:
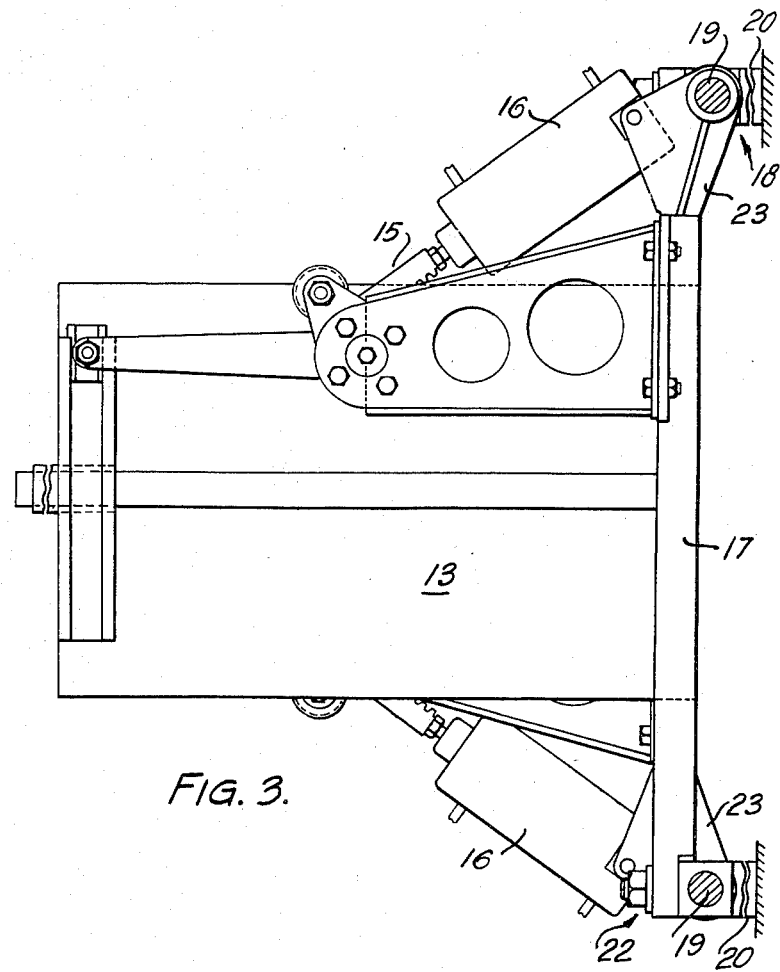
Fig. 3 is a plan view of the stripping apparatus shown in Fig. 2.

Referring particularly to Figs. 2 and 3 showing the stripping apparatus, each stripping plate 13 and 14 and its respective drive mechanism and fluid pressure jack on each apparatus are mounted as an assembly on a supporting carriage 17 extending transversely of the direction of movement of the stripping plate. Each supporting carriage 17 is hingedly mounted at 18 to one of a pair of vertically disposed guide rods 19 arranged one on either side of the supporting carriage and attached to the press by brackets 20 secured to the press by bolts 21, and each supporting carriage is adapted to be clamped by a quick release clamp, generally indicated at 22 to the other of the pair of guide rods 19.

Supporting carriage 17 of the upper stripping apparatus 11 is hingedly mounted on the left guide rod in Figs.

2 and 4(a) and adapted to be clamped to the right guide rod, and the lower stripping apparatus 12 is hingedly mounted on the right guide rod and adapted to be clamped to the left guide rod.

The pair of guide rods 19 form part of a height adjustment mechanism by which each supporting carriage 17 is adapted to be raised and lowered with respect to the press so as to adjust the height of the stripping plates of each stripping apparatus to suit different mould heights.

The pair of guide rods 19 are rotatably connected to each supporting carriage 17 so as to support the carriage whilst being rotatable with respect thereto. The left side of upper supporting carriage 17 and the right side of lower supporting carriage 17 has a vertically spaced pair of brackets 23 rigidly secured thereto each carrying a bearing bush 24, which bearing bushes are mounted on the respective guide rods and constitute the hinge mounting for each supporting carriage. Each guide rod has a fixed collar 25 on which the lower bearing bush 24 of each hinge mounting rests and which supports the hinge mounting against relative vertical downward movement with respect to its guide rod.

The other side of each supporting carriage 17 is formed to provide, in association with the respective guide rod, the quick release clamp 22. Each supporting carriage has a slot 26 formed therein to receive the stem of a threaded bolt 27 carried by a sleeve 28 rotatably mounted on the respective guide rod 19 and supported against relative vertical downward movement with respect to the guide rod by a collar 29 fixed to the guide rod. Each bolt 27 carries a nut 30 which, with the bolt in the slot 26 of its respective supporting carriage 17, when said supporting carriage is swung into operative position, may be tightened to clamp the supporting carriage to the sleeve 28 on the respective guide rod.

The pair of guide rods 19 have screw threaded upper and lower ends 31, each end being in threaded engagement with a fixed nut 32 carried by each of the brackets 20. Rotation of the guide rods, by any suitable means causes the rods to move up or down with respect to the fixed nut 32 and the press, thus raising or lowering each supporting carriage 17 and the stripping apparatus carried thereby. The guide rods 19 are secured in any desired position of vertical adjustment by locking nuts 33 co-operating with each fixed nut 32.

The services passing to the stripping apparatus, which comprise hydraulic lines to the jacks 16, and electric lines for controlling and for indicating purposes, are not shown for the sake of clarity but, as hereinbefore stated, are conveyed in flexible conductors from the press to the respective stripping apparatus in order to accommodate the swinging and vertical adjusting movements of the apparatus with respect to the press.

Referring to Figs. 4(a) and 4(b), the feeding apparatus shown therein is mounted on the other side of the press in a similar manner to the stripping apparatus. The loading plate 7, drive mechanism 8 therefor, and fluid pressure jack 9 are mounted as an assembly on a supporting carriage 34, extending transversely of the direction of movement of the loading plate. The supporting carriage 34 is hingedly mounted at 35 to one of a pair of vertically disposed guide rods 36 arranged one on either side of the supporting carriage and attached to the press by brackets 37 secured to the press by bolts 38. The supporting carriage is adapted to be clamped to the other of a pair of guide rods 36 by a quick release clamp generally indicated at 39.

The pair of guide rods 36 form part of a height adjustment mechanism by which the height of the supporting carriage 34 is adapted to be raised and lowered with respect to the press so as to adjust the height of the loading plate 7 to suit different mould heights.

The guide rods 36 are rotatably connected to the supporting carriage 34 so as to support the carriage whilst being rotatable with respect thereto. The left side of the supporting carriage, as viewed in Fig. 4(a), has rigidly attached thereto, by welding, as shown a vertically spaced pair of bearing bushes 40 which are mounted on the left guide rod 36 so as to constitute the hinge mounting 35 about which the supporting carriage 34 is swingable relative to the guide rod to permit the supporting carriage to be swung to one side of the press to allow access to the moulds and to facilitate maintenance of the feeding apparatus. The guide rod 36 has a fixed collar 41 on which the lower bearing bush 40 rests and which supports the supporting carriage against relative vertical downward movement with respect to the guide rod.

The other side of the supporting carriage 34, the right side in Fig. 4(a), is formed to provide, in association with the right guide rod, the quick release clamp 39 hereinbefore referred to. The supporting carriage has a slot 42 formed therein to receive the stem of a threaded bolt 43 carried by a sleeve 44 rotatably and slidably mounted on the guide rod and supported against relative movement with respect thereto by collars 45. Bolt 43 carries a nut 46 having a handle 47 for manual operation whereby, with bolt 43 in the slot 42 of supporting carriage 34, when the supporting carriage is in operative position, nut 46 may be tightened to clamp the supporting carriage to the sleeve 44.

The guide rods 36 have plain upper ends 48 slidably mounted in bearings 49 carried by the upper brackets 37, and screw threaded lower ends 50, each in threaded engagement with a fixed nut 51 carried by the lower brackets 37. Rotation of the threaded part of each guide rod, by a bar inserted in a hole 52 in the end of the rod or by any other suitable means, causes each rod to move up or down with respect to the fixed nut 51, thus raising or lowering the supporting carriage 34 and the feeding assembly carried thereby. The guide rods 36 are secured in any desired position of vertical adjustment by locking nuts 53 co-operating with the fixed nuts 51.

In this case also hydraulic and electric lines for the feeding apparatus are not shown for the sake of clarity but are conveyed in flexible conductors for the purpose already set out.

An advantage which is obtained by the present invention is that it enables an automatic moulding press which is giving trouble in its automatic operation, to be temporarily operated under semi-automatic conditions by the press operator until the trouble can be found and rectified.

It will be appreciated that, whilst the purpose of the invention is achieved in a very simple manner, nevertheless, the invention is of great importance in facilitating access to the working parts of a fully automatic moulding press for servicing etc. of the parts, which would normally require much dismantling of the press, in order to attain similar access.

What is claimed is:

1. In combination, a moulding press adapted to be fully automatic in operation and having relatively movable platens carrying separable cooperating mould parts, a moulded article stripping apparatus for removing moulded articles from the press when the mould parts are separated, means mounting said stripping apparatus at one side of the press, a first vertically disposed guide rod mounted on said press adjacent a corner of the press at the opposite side thereof, a supporting carriage hingedly mounted at one of its sides on said first guide rod, a moulding material loading apparatus mounted on said supporting carriage to swing therewith about the vertical axis of hinging of said supporting carriage on said first guide rod, said loading apparatus and said supporting carriage being swingable about said axis outwardly away from the press to a non-operative position in which said opposite side of the press is substantially exposed, and inwardly toward the press to an operative position, a second vertically disposed guide rod mounted on the press at the other side of said supporting carriage, when the latter is in operative position, and quick release clamp means for clamping said supporting carriage to said second guide rod when said loading apparatus is in operative position.

2. A structure according to claim 1 in which the means mounting said guide rods on said press comprise screw threaded portions on said guide rods and screw threaded means carried by the press, said screw threaded portions being cooperable with said screw threaded means, on rotation of said guide rods, for effecting vertical movement of said guide rods and said supporting carriage with respect to the press.

3. In combination, a moulding press adapted to be fully automatic in operation and having relatively movable platens carrying separable cooperating mould parts, a moulding material feeding apparatus for feeding moulding material to one of the mould parts when the mould parts are separated, means mounting said feeding apparatus at one side of the press, a first vertically disposed guide rod mounted on said press adjacent a corner of the press at the opposite side thereof, a supporting carriage hingedly mounted at one of its sides on said first guide rod, a moulded article stripping apparatus for removing moulded articles from the press when the mould parts are separated, means mounting said stripping apparatus on said supporting carriage to swing therewith about the vertical axis of hinging of said supporting carriage on said first guide rod, said stripping apparatus and said supporting carriage being swingable about said axis outwardly away from the press to a non-operative position in which said opposite side of the press is substantially exposed, and inwardly toward the press to an operative position, a second vertically disposed guide rod mounted on the press at the other side of said supporting carriage, when the latter is in operative position, and quick release clamp means for clamping said supporting carriage to said second guide rod when said stripping apparatus is in operative position.

4. A structure according to claim 3 in which the means mounting said guide rods on said press comprise screw threaded portions on said guide rods and screw threaded means carried by the press, said screw threaded portions being cooperable with said screw threaded means, on rotation of said guide rods, for effecting vertical movement of said guide rods and said supporting carriage with respect to the press.

5. In combination, a moulding press adapted to be fully automatic in operation and having upper and lower platens carrying separable co-operating mould parts, a moulding material loading apparatus for feeding moulding material to the mould part of said lower platen, said loading apparatus being hingedly mounted on one side of the press about a vertical axis for swinging movement with respect to the press from an operative to a non-operative position, a first supporting carriage on which the loading apparatus is mounted, a first vertically disposed guide rod slidably and rotatably mounted on the press at one side of said supporting carriage on which guide rod said supporting carriage is swingably mounted, a second vertically disposed guide rod slidably and rotatably mounted on the press at the other side of said supporting carriage when said supporting carriage is in operative position, a quick release clamp means for locking said supporting carriage to said second guide rod in operative position, screw threaded portions on said first and second guide rods, screw threaded means carried by the press and co-operating with the screw threaded portions of said guide rods and serving to cause, on rotation of said guide rods, vertical movement of said guide rods and of said loading apparatus supporting carriage with respect to the press, a first stripping apparatus mounted on the opposite side of the press and arranged for operative association with the mould part of said upper platen, a second stripping apparatus mounted below said first stripping apparatus for operative association with the mould part of said lower platen, a second supporting carriage on which said first stripping apparatus is mounted, a third supporting carriage on which said second stripping apparatus is mounted, a third vertically disposed guide rod rotatably mounted on the press at one side of each of said stripping apparatus supporting carriages on which third guide rod said second supporting carriage is mounted for swinging movement with respect to the press from an operative to a non-operative position, a quick release clamp means rotatably mounted on said third guide rod for locking said third supporting carriage to said third guide rod in operative position, a fourth vertically disposed guide rod rotatably mounted on the press at the other side of said stripping apparatus supporting carriages on which fourth guide rod said third supporting carriage is mounted for swinging movement with respect to the press from an operative to a non-operative position, a quick release clamp means rotatably mounted on said fourth guide rod for locking said second supporting carriage to said fourth guide rod in operative position, screw threaded portions on said third and fourth guide rods, screw threaded means carried by the press and co-operating with the screw threaded portion of said third and fourth guide rods and serving to cause, on rotation of said third and fourth guide rods, vertical movement of said third and fourth guide rods and of both said stripping apparatus supporting carriages with respect to the press.

References Cited in the file of this patent

UNITED STATES PATENTS

| | | |
|---|---|---|
| 2,054,476 | Derry et al. | Sept. 15, 1936 |
| 2,193,879 | Muenzer | Mar. 19, 1940 |
| 2,582,891 | Strauss | Jan. 15, 1952 |